US008422089B2

(12) United States Patent  
Wang

(10) Patent No.: US 8,422,089 B2  
(45) Date of Patent: Apr. 16, 2013

(54) SCANNING DEVICE

(75) Inventor: Chih-Hwa Wang, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 282 days.

(21) Appl. No.: 12/831,280

(22) Filed: Jul. 7, 2010

(65) Prior Publication Data

US 2011/0299133 A1 Dec. 8, 2011

(30) Foreign Application Priority Data

Jun. 4, 2010 (TW) .............................. 99118190 A

(51) Int. Cl.
*H04N 1/04* (2006.01)
(52) U.S. Cl.
USPC .......................................... 358/474; 358/497
(58) Field of Classification Search ................... 358/497, 358/474, 482–483; 250/208.1
See application file for complete search history.

(56) References Cited

U.S. PATENT DOCUMENTS

| 6,005,686 A * | 12/1999 | Hong | 358/497 |
| 7,486,423 B2 * | 2/2009 | Chang et al. | 358/497 |
| 7,744,209 B2 * | 6/2010 | Nakashima | 347/104 |
| 7,755,810 B2 * | 7/2010 | Kuse | 358/474 |
| 7,768,679 B2 * | 8/2010 | Yamaguchi | 358/497 |
| 2005/0088706 A1 * | 4/2005 | Lin | 358/474 |

* cited by examiner

*Primary Examiner* — Marivelisse Santiago Cordero
*Assistant Examiner* — Temitayo Folayan
(74) *Attorney, Agent, or Firm* — Jianq Chyun IP Office

(57) ABSTRACT

A scanning device including a base, a guiding module and a scanning head is provided. The guiding module includes a guiding rod, a guiding element, a sliding element and an elastic element. The guiding rod is fixed to the base. The guiding element has a notch, wherein the guiding rod is slidingly disposed at the notch along a first axial direction. The sliding element is slidingly disposed at the guiding element along a second axial direction substantially perpendicular to the first axial direction. The elastic element is fixed to the guiding element and contacts with the sliding element, wherein the sliding element pushes the guiding rod to contact an inner wall of the notch along the second axial direction by an elastic force of the elastic element, so as to prevent the guiding rod from swaying during a scanning process.

6 Claims, 3 Drawing Sheets

SCANNING DEVICE

CROSS-REFERENCE TO RELATED APPLICATION

This application claims the priority benefit of Taiwan application serial no. 99118190, filed on Jun. 4, 2010. The entirety of the above-mentioned patent application is hereby incorporated by reference herein and made a part of specification.

BACKGROUND

1. Field of the Disclosure

The present disclosure relates to an image capturing device. More particularly, the present disclosure relates to a scanning device.

2. Description of Related Art

Recently, with a rapid development of computer technology, and a price of scanning devices goes down because of a strong market competition, the scanning devices become very popular computer peripherals in the market.

The scanning devices can be grouped into a plurality of patterns according to prices and functions thereof. In detail, the scanning devices can be grouped into handheld scanning devices, sheet-fed scanning devices, business card scanning devices, film scanning devices and flatbed scanning devices, etc. Taking the flatbed scanning device as an example, a scanning head capable of moving on a base is used to perform image scanning to a paper disposed on the base. In detail, the scanning head can be slidingly disposed at a guiding rod fixed on the base, and a pulley and a belt can be used to drive the scanning head to move on the base along the guiding rod. However, during a moving process of the scanning head, the scanning head can be swayed due to a torque caused by a pulling stress of the belt, which may influence a scanning quality.

SUMMARY

The present disclosure is directed to a scanning device, and a chance of a guiding rod thereof which is swayed during a scanning process is reduced.

The present disclosure provides a scanning device including a base, a guiding module and a scanning head. The guiding module includes a guiding rod, a guiding element, a sliding element and an elastic element. The guiding rod is fixed to the base. The guiding element has a notch, wherein the guiding rod is slidingly disposed at the notch along a first axial direction. The sliding element is slidingly disposed at the guiding element along a second axial direction substantially perpendicular to the first axial direction. The elastic element is fixed to the guiding element and contacts with the sliding element, wherein the sliding element pushes the guiding rod to contact an inner wall of the notch along the second axial direction by an elastic force of the elastic element. The scanning head is fixed to the guiding element.

In an exemplary embodiment of the disclosure, the elastic element is a spring sheet.

In an exemplary embodiment of the disclosure, the sliding element is a roller.

In an exemplary embodiment of the disclosure, the guiding element has a sliding trough, and the roller is slidingly disposed at the sliding trough along the second axial direction, and is pivotally connected to the sliding trough along a third axial direction substantially perpendicular to the first axial direction and the second axial direction.

In an exemplary embodiment of the disclosure, the inner wall has two inclined surfaces, and the guiding rod is clamped between the two inclined surfaces and the roller.

In an exemplary embodiment of the disclosure, the scanning device further includes a driving motor, a pulley and a belt. The driving motor is disposed on the base. The pulley is connected to the driving motor. The belt is connected between the pulley and the scanning head, wherein the driving motor drives the pulley to rotate, so as to drive the belt to pull the scanning head to move along the first axial direction.

In an exemplary embodiment of the disclosure, the guiding rod is a hollow cylindrical rod, and a part of the belt is pivoted to the guiding rod along the first axial direction.

In an exemplary embodiment of the disclosure, the pulley is pivotally connected to the driving motor along the third axial direction.

According to the above descriptions, the sliding element of the disclosure pushes the guiding rod to contact the notch by an elastic force of the elastic element. In this way, the guiding rod can be leaned closely against the inner wall of the notch, so as to prevent the guiding rod from swaying during the scanning process, and accordingly improve a scanning quality.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
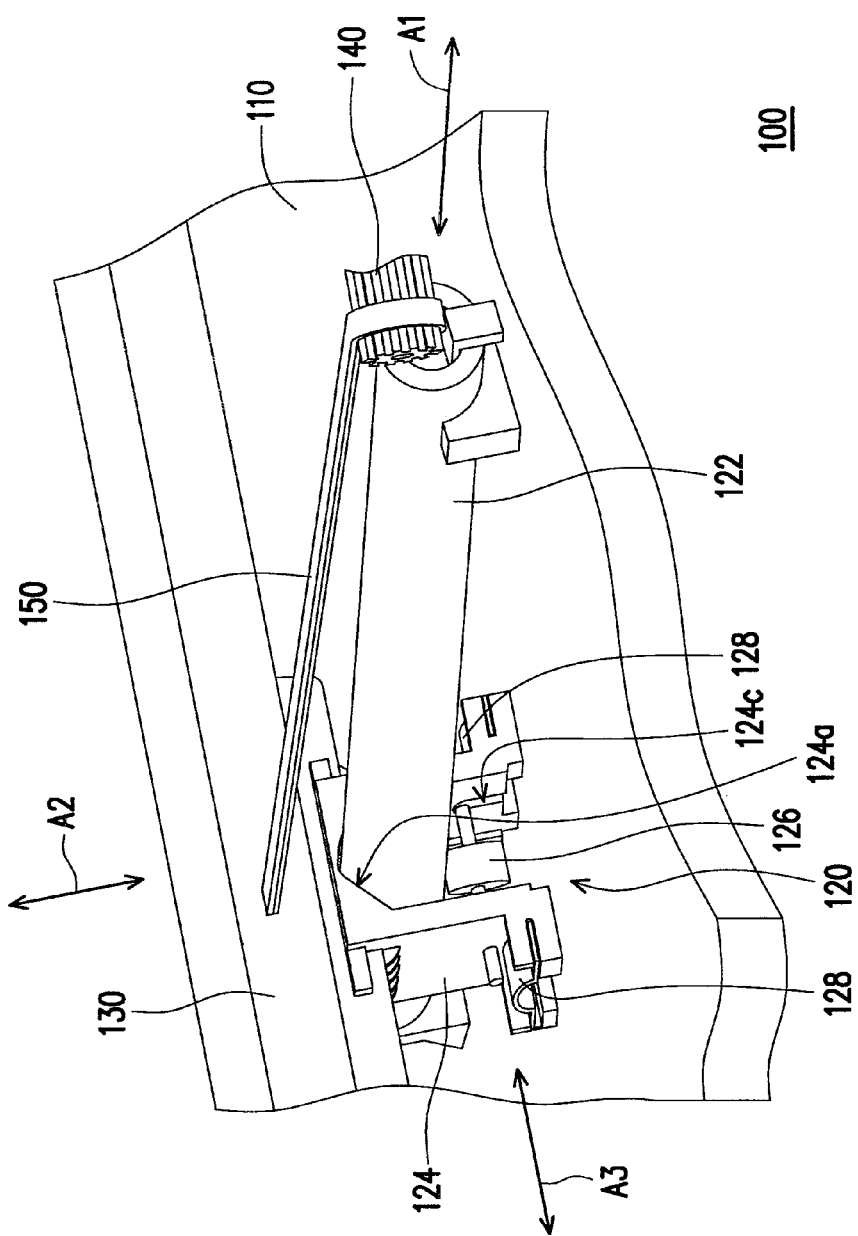
FIG. 1 is a partial three-dimensional view of a scanning device according to an exemplary embodiment of the disclosure.
Figure 2:
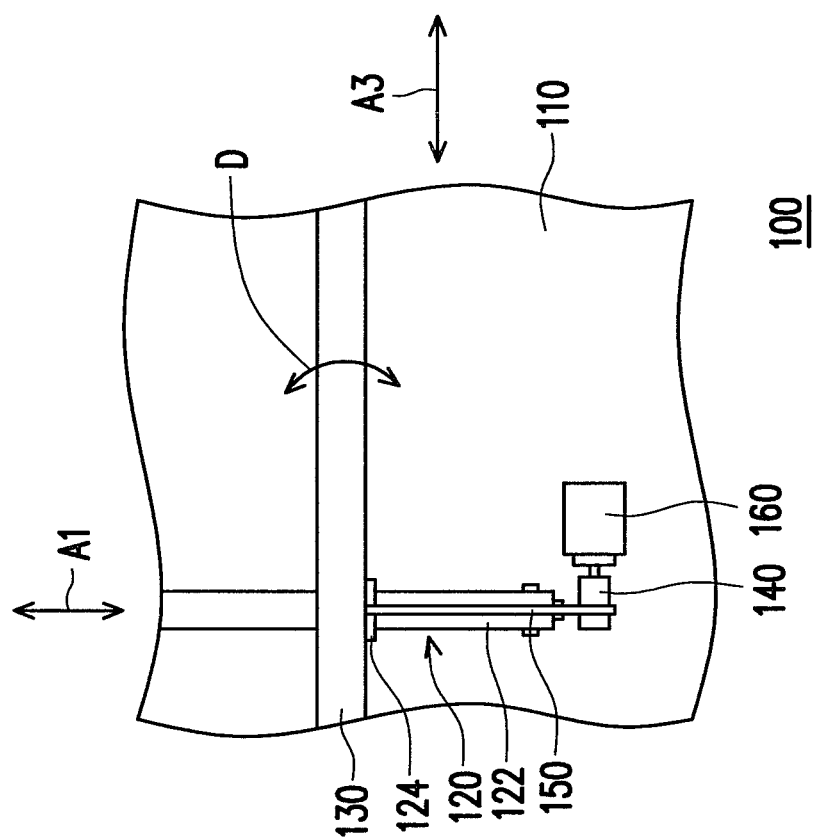
FIG. 2 is a top view of a scanning device of FIG. 1.

FIG. 1 is a partial three-dimensional view of a scanning device according to an exemplary embodiment of the disclosure. FIG. 2 is a top view of the scanning device of FIG. 1. Referring to FIG. 1, the scanning device 100 includes a base 110, a guiding module 120 and a scanning head 130. The guiding module 120 includes a guiding rod 122, a guiding element 124, a sliding element 126 and elastic elements 128 (two elastic elements are illustrated). The guiding rod 122 is fixed to the base 110. The guiding element 124 has a notch 124a, wherein the guiding rod 122 is slidingly disposed at the notch 124a along a first axial direction A1. The scanning head 130 is fixed to the guiding element 124, so as to perform scanning following the movement of the guiding element 124 along the guiding rod 122 along the first axial direction A1.

Figure 3:
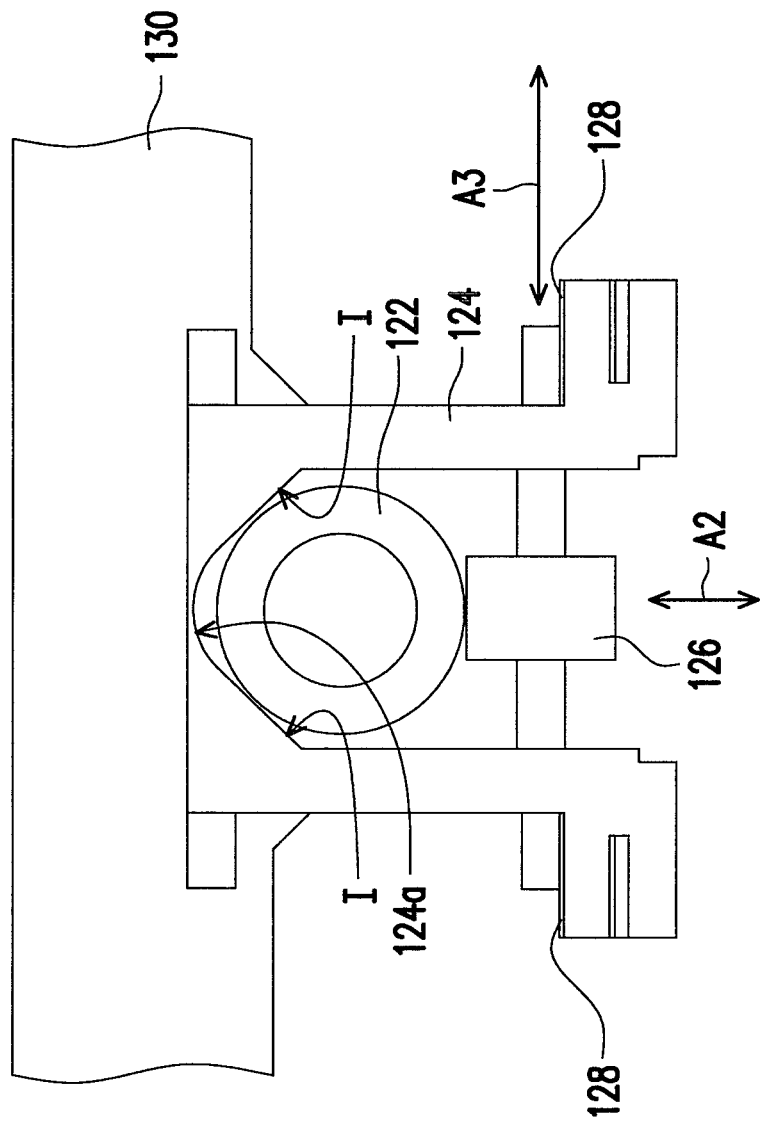
FIG. 3 is a partial front view of a scanning device of FIG. 1.

FIG. 3 is a partial front view of the scanning device of FIG. 1. Referring to FIG. 3, the sliding element 126 is slidingly disposed at the guiding element 124 along a second axial direction A2 substantially perpendicular to the first axial direction A1. The elastic element 128 of the present exemplary embodiment is, for example, a spring sheet, which is fixed to the guiding element 124 and contacts with the sliding element 126, wherein the sliding element 126 pushes the guiding rod 122 to contact an inner wall 124b of the notch 124a along the second axial direction A2 by an elastic force of the elastic element 128, and therefore the notch 124a is forced by the elastic force to stay closely to the guiding rod 122. In this way, the guiding rod 122 is maintained to be leaned closely against the inner wall 124b of the notch 124a, so as to prevent the guiding rod 122 from swaying during the scanning process, and accordingly a scanning quality is improved.

Referring to FIG. 1, in detail, the sliding element 126 is, for example, a roller, the guiding element 124 has a sliding trough 124c extending along the second axial direction A2, and the sliding element 126 is slidingly disposed at the sliding trough 124c along the second axial direction A2, and is pivotally connected to the sliding trough 124c along a third axial direction A3 substantially perpendicular to the first axial direction A1 and the second axial direction A2. In this way, when the guiding rod 122 slides relative to the guiding element 124 along the first axial direction A1 and contacts with the sliding element 126, the sliding element 126 can be rotated along the third axial direction A3 along with a movement of the guiding element 124, so that a relative sliding between the guiding rod 122 and the guiding element 124 can be smoother.

Referring to FIG. 3, in the present exemplary embodiment, the inner wall 124b of the notch 124a includes two inclined surfaces I, and the guiding rod 122 is clamped between the two inclined surfaces I and the roller 126, so that the guiding rod 122 is not easy to be swayed. Moreover, referring to FIG. 1 and FIG. 2, the scanning device 100 of the present exemplary embodiment further includes a pulley 140, a belt 150 and a driving motor 160 (which is illustrated in FIG. 2). The driving motor 160 is disposed on the base 110. The pulley 140 is connected to the driving motor 160. The belt 150 is connected between the pulley 140 and the scanning head 130. The driving motor 160 drives the pulley 140 to rotate, so as to drive the belt 150 to pull the scanning head 130 to move along the first axial direction A1. In detail, as shown in FIG. 1, the guiding rod 122 of the present exemplary embodiment is a hollow cylindrical rod, and a part of the belt 150 is pivoted to the guiding rod 122 along the first axial direction A1, so as to save a configuration space of the base 110.

Referring to FIG. 2, the pulley 140 is pivotally connected to the driving motor 160 along the third axial direction A3, so that a torque arm of a torque generated when the belt 150 pulls the scanning head 130 extends along the second axial direction A2. In this way, when the belt 150 is driven by the pulley 140 to pull the scanning head 130, the guiding rod 122 sways relative to the scanning head 130 along a direction D that is generated due to that the belt 150 pulls the scanning module 130 can be avoided. However, the present disclosure is not limited thereto, and the pulley 140 can also be pivotally connected to the base 110 along other suitable axial directions, so that a rotation of the pulley 140 can drive the belt 150 to pull the scanning head 130 to move along the first axial direction A1.

In summary, the sliding element of the disclosure pushes the guiding rod to contact the notch by an elastic force of the elastic element. In this way, the guiding rod can be leaned closely against the inner wall of the notch, so as to prevent the guiding rod from swaying during the scanning process, and accordingly a scanning quality is improved. Moreover, the sliding element can be a roller, and when the guiding rod slides relative to the guiding element and contacts with the sliding element, the sliding element can be rotated along with a movement of the guiding element, so that a relative sliding between the guiding rod and the guiding element can be smoother.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A scanning device, comprising:
    a base;
    a guiding module, comprising:
        a guiding rod, fixed to the base;
        a guiding element, having a notch, wherein the guiding rod is slidingly disposed at the notch along a first axial direction;
        a sliding element, slidingly disposed at the guiding element along a second axial direction substantially perpendicular to the first axial direction;
        an elastic element, fixed to the guiding element and contacting with the sliding element to push the sliding element toward the guiding rod, wherein the sliding element pushes the guiding rod to contact an inner wall of the notch along the second axial direction by an elastic force of the elastic element;
    a scanning head, fixed to the guiding element;
    a driving motor, disposed on the base;
    a pulley, connected to the driving motor; and
    a belt, connected between the pulley and the scanning head, wherein the driving motor drives the pulley to rotate, so as to drive the belt to pull the scanning head to move along the first axial direction, wherein the guiding rod is a hollow cylindrical rod, and a part of the belt is pivoted to the guiding rod along the first axial direction, wherein the belt is partially located in the guiding rod.

2. The scanning device as claimed in claim 1, wherein the elastic element is a spring sheet.

3. The scanning device as claimed in claim 1, wherein the sliding element is a roller.

4. The scanning device as claimed in claim 3, wherein the guiding element has a sliding trough, and the roller is slidingly disposed at the sliding trough along the second axial direction and pivotally connected to the sliding trough along a third axial direction substantially perpendicular to the first axial direction and the second axial direction.

5. The scanning device as claimed in claim 1, wherein the inner wall has two inclined surfaces, and the guiding rod is clamped between the two inclined surfaces and the roller.

6. The scanning device as claimed in claim 1, wherein the pulley is pivotally connected to the driving motor along the third axial direction.

* * * * *